Figure 1:
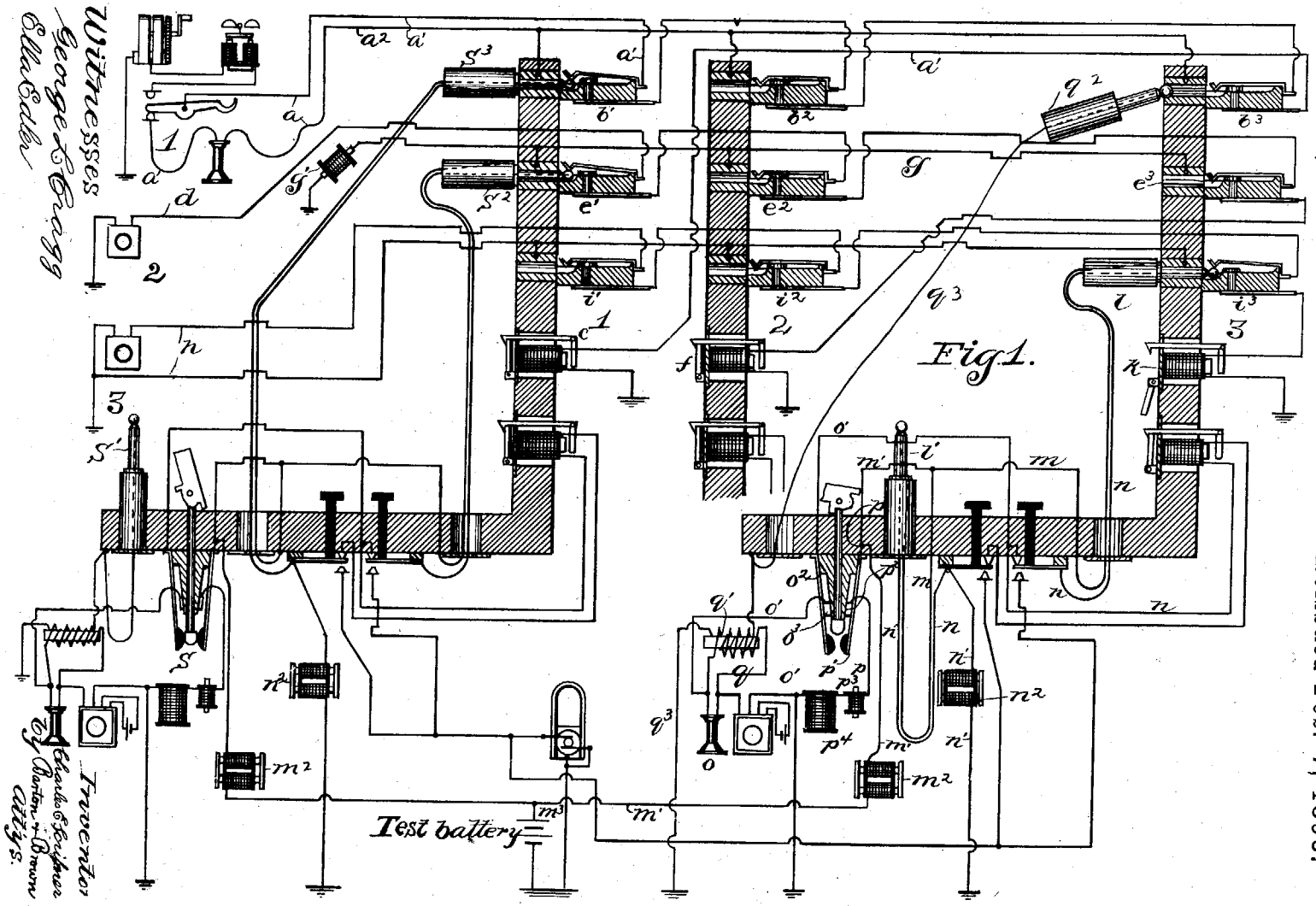

2 Sheets—Sheet 1.

C. E. SCRIBNER.

MULTIPLE SWITCHBOARD SYSTEM.

No. 11,306. Reissued Feb. 7, 1893.

THE NORRIS PETERS CO., PHOTO-LITHO., WASHINGTON, D. C.

2 Sheets—Sheet 2.

C. E. SCRIBNER.

MULTIPLE SWITCHBOARD SYSTEM.

No. 11,306. Reissued Feb. 7, 1893.

Witnesses:
George L. Cragg
Ella Edler

Inventor
Charles E. Scribner.
by Barton & Brown
Attys.

THE NORRIS PETERS CO., PHOTO-LITHO., WASHINGTON, D. C.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

MULTIPLE-SWITCHBOARD SYSTEM.

SPECIFICATION forming part of Reissued Letters Patent No. 11,306, dated February 7, 1893.

Original No. 442,143, dated December 9, 1890. Application for reissue filed November 6, 1891. Serial No. 411,100.

*To all whom it may concern:*

Be it known that I, CHARLES E. SCRIBNER, a citizen of the United States, residing at Chicago, in the county of Cook and State of Illinois, have invented a certain new and useful Improvement in Multiple-Switchboard Systems, (Case No. 175,) of which the following is a full, clear, concise, and exact description, reference being had to the accompanying drawings, forming a part of this specification.

In multiple switch board systems of telephone-exchange, single wire telephone-circuits and metallic telephone-circuits have been heretofore used upon the same switchboards and various means have been employed for enabling the operator at one board to test any wire called for to determine whether the line is busy.

My invention herein relates more especially to the operator's apparatus, and by its use the circuits are simplified. The metallic circuits are balanced, so as to avoid the effects of induced currents from other circuits. The test for all lines, whether metallic or grounded, is made uniform, while the single or grounded circuit lines may be extended to form metallic circuits without disturbing the connections upon the switch-board with the spring-jack switches.

A feature of this invention consists in the discovery that the introduction of a retardation-coil into a ground branch extended from one side of a metallic circuit entirely overcomes the harmful effect of such ground branch by preventing the flow of the induced currents, which would otherwise create a noise in the telephone.

In my system as hereinafter described each metallic circuit consists of two branches, one branch normally extending from ground at the subscriber's station, through the generator and bell to the telephone switch, and thence to the central station, where it is connected through the spring and contact of a different switch on each of the switch boards and from the contact of the switch on the last board through an individual annunciator to ground. The other branch extends from a contact near the telephone-switch, through the telephone at the subscriber's station and thence to the ring or test-piece of the several switches through which the other branch is connected. The single or grounded telephone circuits extend each from ground at the subscriber's station, in the usual manner, to the central station through a spring and contact of a different spring-jack switch on each of the boards and from the contact of the switch on the last board through an annunciator to ground. The rings or test-pieces of the spring-jack switches are connected together by a test-wire which is grounded through high resistance—say five hundred ohms. At each switch board I provide pairs of loop-plugs, a test-plug, a telephone, and generator, in connection with switching apparatus arranged for receiving the subscriber's orders, testing-lines called for, and making the connections and disconnections between the lines. The strand of each pair of cords connecting the sleeves of the plugs of the pair I connect through a self-induction coil of, say, six hundred ohms resistance, and wound with, say, ten thousand convolutions of No. 32 copper wire through a test battery, which may be a storage battery of, say, ten volts to ground. The other strand of each pair—that is to say, the strand connecting the tips of the plugs—is connected through a self-induction coil of the same resistance and wound in the same manner to ground. When two lines are looped together in metallic circuit, the opposite sides of the metallic circuit thus formed will therefore be connected to ground on one side through a self-induction coil only and on the other side through a self-induction coil and test-battery. In connection with each pair of cords I provide a switch by means of which the telephone, which is included in a normally-open ground-circuit, may be connected by a half connection with the strand of the cord connecting the tips. In order that the balance of the different sides of the metallic circuits may be maintained, I provide a dummy telephone set in a normally open-ground-circuit so arranged that when connection is made from the strand connecting the tips through the regular telephone set another connection will be made from the strand connecting the sleeves through the dummy telephone set to ground. As the dummy set I preferably use a regular microphone-induction coil and a self-induction coil having the same number of convolutions and the same amount of iron as are used in the telephone, in order that the dummy set may have the same self-inductive effects as the regular telephone set. The strand connecting the sleeves of each of all the pairs of cords on the different boards may be connected with the same test-battery.

Figures 2, 3:
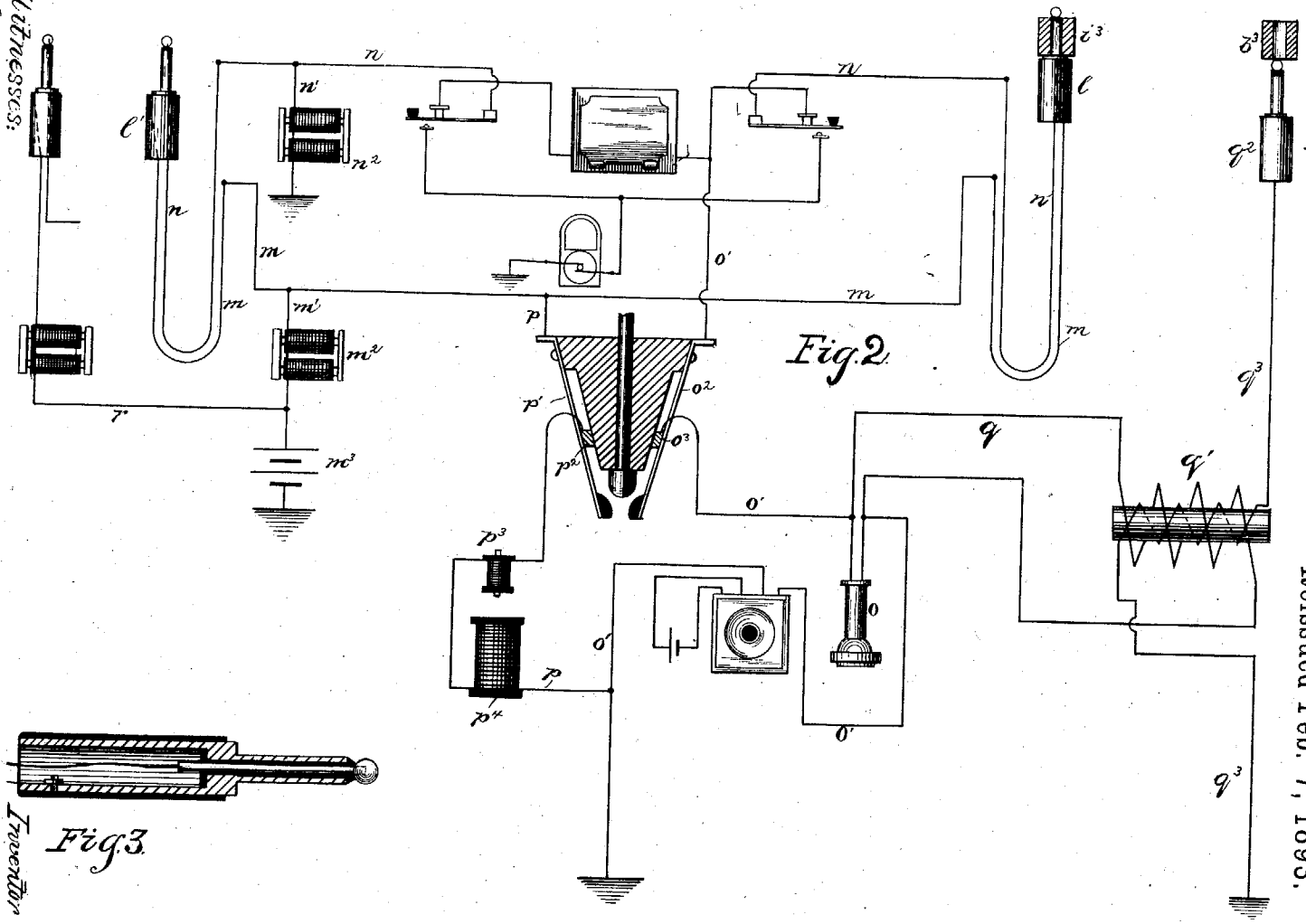

In the accompanying drawings, which are illustrative of my invention, Figure 1 is a diagram showing three telephone-lines—two metallic and one single—connected with three switch-boards and an operator's outfit at two of the boards. Fig. 2 is a detailed view illustrative of a pair of cords and loop-plugs and the connections with the different strands thereof to ground through the self-induction coils, together with the switch for connecting and disconnecting the telephone set and the corresponding self-induction and induction coils with the different strands, the test-plug and its circuit through one coil of an induction-coil, the other coil including the telephone, the test-battery, and a connection therefrom leading to a second pair of cords. Fig. 3 is a detailed sectional view of one of the loop-plugs.

Like parts are indicated by similar letters and numerals of reference throughout the different figures.

Subscriber's station 1 in Fig. 1 is connected with the switch-boards 1, 2, and 3 at the central office by a metallic circuit $a$, consisting of two branches or limbs $a'$ $a^2$. The normal circuit of limb $a'$ may be traced from ground at subscriber's station 1, through the generator and bell at said station to the telephone-switch, and thence, as shown, to the central office, and thence through the spring and contact of switches $b'$ $b^2$ $b^3$ on the different switch-boards, and from the contact of the switch $b^3$ on the last board, through an individual annunciator $c$, and thence to ground. The circuit of the limb or branch $a^2$ may be traced normally from a contact point near the telephone-switch of station 1, through the telephone at said station, and thence, as shown, to the central office to the test-pieces or insulated tubes of the series of switches $b'$ $b^2$ $b^3$. The metallic circuit as thus traced is old and well known. The single or grounded telephone-line $d$ extends in the ordinary way from subscriber's station 2 to the central office, and thence through switches $e'$, $e^2$, and $e^3$—one on each of the switch-boards—and from the switch on the last board through an individual annunciator $f$ to ground. This grounded circuit is provided with a test-wire $g$, which connects together the frames or test-pieces of the switches $e'$ $e^2$ $e^3$, and through resistance $g'$ of, say, five hundred ohms, to ground at the central station. Thus the test-wire of each single line is provided with a connection or terminal on each of the switches of the line, the terminals or test-pieces being normally open, the test-circuit being provided, however, with a permanent ground-connection through high resistance. The connection to ground through high resistance is a novel feature of my invention.

The metallic circuit $h$ of station 3 is connected with switches $i'$ $i^2$ $i^3$, and through an annunciator $k$ in the same manner heretofore described with respect to the circuit of station 1. At each of boards 1 and 3, I have shown an operator's outfit. At board 1 the telephone lines $a$ $d$ are shown looped together. At board 3 connection has been made with switch $i^3$ of line $h$, and the test-plug is shown touching the test-piece of switch $b^3$, as if the subscriber 3 had called for subscriber 1, and the operator, having received the call, was in the act of testing to find out whether the line of subscriber 1 was in use. As line $a$ of subscriber 1 is connected with line $d$ of subscriber 2 at board 1, the operator testing at board 3, as shown, will find the busy-test indicated.

In Fig. 2 I have shown an operator's outfit in detail in the position indicated at board 3, Fig. 1.

I will describe the operator's outfit shown in Fig. 2 in detail. The loop-plugs $l$ $l'$ are of the form shown in Fig. 3, and are connected by a pair of flexible cords. Strand $m$ connects the insulated sleeves of the two loop-plugs together, while the tips of said plugs are connected together by means of strand $n$. A branch $m'$ extends from strand $m$ through self induction coil $m^2$, and test battery $m^3$ to ground. From the strand $n$, which connects the tips, a branch $n'$ extends through a self-induction coil $n^2$ to ground. Thus we have from each of the strands of the cords connecting loop-plugs $l$ $l'$, a branch connection to ground, and in each of these branches is included a self-induction coil, the branch from the strand connecting the sleeves after passing through its self-induction coil $m^2$ being connected through a test battery $m^3$. These self-induction coils $n^2$ and $m^2$ should be of the same construction, in order that their self inductive effects will be the same upon the different sides of a metallic circuit formed when two metallic telephone-lines are looped together by means of the loop-plugs $l$ $l'$.

The operator's telephone $o$ is connected in branch wire $o'$ with the strand $n$, which connects the tips of the loop-plugs. This branch $o'$ includes spring $o^2$, and telephone-contact $o^3$ of a loop-switch, and after passing through the telephone set is connected with ground.

To balance the self-inductive effects of the telephone set $o$, I provide a branch $p$ from the strand $m$, connecting the sleeves of the plugs, which branch $p$ extends through spring $p'$ and contact $p^2$ through a self-induction coil $p^3$ and an ordinary microphone-induction coil $p^4$ to ground. Thus whenever the telephone $o$ is connected with the strand $n$, as shown in Fig. 2, a branch $p$ is closed to the other strand $m$ of the cords through apparatus $p^3$ $p^4$, having the same self-inductive capacity as the telephone set. Bridged across the telephone is a wire $q$, including a winding of the converter or induction-coil $q'$. Test plug $q^2$ is simply an ordinary terminal which is provided with a single connection or strand $q^3$, which includes the other winding of converter $q'$ and extends to ground.

It is evident that the presence of a vibratory or pulsatory current upon wire $q^3$ will be indicated to one listening at the telephone $o$. Wire $r$, connecting between self-induction coil $m^2$ and battery $m^3$, is simply a connection with a strand of another pair of cords. There may be, for example, twenty pairs of cords at each switch-board. I will not specifically describe the clearing-out annunciator, the calling keys, and the generator connections, since they are old and their operation understood by those having any knowledge of telephone-exchange apparatus.

The operator's apparatus at board 3, Fig. 1, is lettered to correspond with the same apparatus in Fig. 2. The operator's apparatus at board 1 of Fig. 1 is the same, though shown in a different position. At board 3 the telephone $o$ is in circuit, while at board 1 the telephone circuit is open at the loop switch $s$, the plunger of said switch $s$ being forced down so as to lift the springs of said switch from their contacts. The test-plug $s'$ is resting in its socket, while the two loop-plugs $s^2 s^3$ are shown inserted in the spring jack-switches $e'$ $b'$, so as to loop the telephone lines $a$ and $d$ together.

When any two lines are connected together, whether metallic or single or a metallic circuit with a single circuit, as shown, the test-battery $m^3$ will be connected to the test-pieces to all the spring-jack switches of the two connected lines. In case of metallic circuits it is essential that the connection with the test-battery be through a self-induction coil, and it is especially desirable, though, not essential, that the other branch or limb of the circuit be provided with a corresponding branch ground-connection through a self-induction coil of the same character, in order that there may be a balance between the different sides of the metallic circuit. When the operator connects his telephone to one side of a metallic circuit, it is also desirable that a corresponding connection be made with the opposite side of the metallic circuit, in order that the balance with respect to inductive effects may be maintained.

The steps or motions of the operator in receiving a call, testing the line called for, completing the connections, and disconnecting the lines when the subscribers are done talking are briefly as follows: The individual annunciator-drop, as $k$, falls. The operator at once inserts the answering loop-plug $l$ in the spring jack switch of the corresponding line and brings the telephone $o$ into circuit and receives the order. Thereupon the test is made of the line called for by applying terminal $q^2$ to the test-piece of the spring-jack switch of the line thus required. If the line is busy, the test-piece of the spring-jack switch tested will be connected with battery and current from said battery will be sent over wire $q^3$, which will cause a sound in the telephone $o$. This will be notice to the operator that the line tested is busy and the calling subscriber will be notified to wait. If, however, there is no sound in the telephone when the test is made, the operator will know that the line wanted is idle and will at once complete the connection by inserting the other plug of the pair, as $l'$, in the spring-jack switch of the line. The connections will then be complete, and the called subscriber will be notified by current sent from the generator over his line. The clearing-out signal is received upon a clearing-out annunciator included in the strand connecting the tips of the plugs. The operator, seeing the clearing-out drop fall, listens to make sure that the subscribers are through and then simply pulls out the loop-plugs.

It will be observed that the balance is maintained during the entire time that the two lines are connected.

My invention admits of various modifications that would readily suggest themselves to those having any special knowledge of telephone-exchange apparatus, and I therefore do not limit myself to the details of construction shown.

Having thus described my invention, I claim as new and desire to secure by Letters Patent—

1. The combination, with metallic-circuit telephone-lines looped together in metallic circuits by a pair of loop-plugs and flexible cords, of a branch circuit to ground from the strand connecting the sleeves of the plugs, said branch including a self-induction coil and a battery, said telephone-lines being connected each with different switches on each of two or more switch-boards, and the sleeves of said plugs being connected, respectively, with the test-pieces of the switches of the respective lines, whereby the test-battery is connected to said test-pieces, while the flow of induced currents upon the metallic circuit is prevented, substantially as described.

2. The combination, with a telephone-line connected with switches distributed on different switch-boards, of test-pieces, one on each switch, the test-pieces being permanently connected together by a wire connected through resistance, of a loop-plug inserted in one of said switches, the tip of said plug lifting the spring of the switch in which it is inserted and forming contact therewith, while the sleeve of said plug is connected with the test-piece of said switch, a branch circuit to ground from the strand of the cord connected with the sleeve of the plug, and a self induction coil and battery included in said ground branch, substantially as and for the purpose specified.

3. A pair of loop-plugs and flexible cords adapted to connect two telephone-lines together, in combination with a branch circuit from one of said strands through a self-induction coil and battery to ground, and a corresponding branch circuit to ground from the other strand through a corresponding self-induction coil, substantially as described.

4. The combination, with a metallic-circuit telephone-line extending from a subscriber's station to a spring-jack switch at the central station, of a loop plug inserted in said switch, a flexible cord having two strands connected with the different terminals of said plug, the operator's telephone outfit, and a corresponding dummy outfit, and a switching device whereby the telephone outfit and the dummy outfit may be connected to the different strands of the cords, substantially as described.

5. The combination, with the two strands of a flexible cord, each strand being provided with a permanent ground-connection of two branch circuits to ground connected with the different strands of the cord, one branch containing a telephone and the other branch containing a corresponding self-induction coil, and a switching device whereby the telephone and the corresponding self-induction device may be connected at the same time with the different strands, respectively, of the cord.

6. In a telephone-exchange apparatus, a pair of cords provided with terminal loop-plugs adapted to form connections between the telephone-line terminals, of a permanent branch connection from one of the strands of said cords through a self-induction coil and a battery to ground, substantially as and for the purpose specified.

7. The combination, with a metallic circuit $a$, extending from a subscriber's station to the central office and being there normally connected with several spring-jack switches $b'$ $b^2$ $b^3$ on different switch-boards, of a single telephone-line circuit $d$, extending from its subscriber's station to the central office and being there connected with several spring-jack switches $e'$ $e^2$ $e^3$ on different switch-boards, the test-circuit $g$, connected with the insulated frames or test-pieces of said switches $e'$, $e^2$, $e^3$, said test-circuits being connected through resistance $g'$ to ground, a pair of loop-plugs $s^2$ $s^3$ and their cords connecting said telephone-lines together upon one of the switch-boards, a test-battery, and a self-induction coil branched to the strand of the cord connecting the sleeves of the plugs, and a current indicating device at another board adapted to be connected to the test-ring of either of the switches of said line, whereby it may be determined whether either of said lines is in use.

8. The combination, with a metallic circuit $a$ extending from a subscriber's station to the central office and being there normally connected with several spring-jack switches $b'$ $b^2$ $b^3$ on different switch-boards, of a single telephone-line circuit $d$, extending from its subscriber's station to the central office and being there connected with several spring-jack switches $e'$ $e^2$ $e^3$ on different switch boards, the test-circuit $g$, connected with the insulated frames or test pieces of said switches $e'$ $e^2$ $e^3$, said test-circuits being connected through resistance $g'$ to ground, a pair of loop-plugs $s^2$ $s^3$ and their cords connecting said telephone-lines together upon one of the switch-boards, a test-battery, and a self-induction coil branched to the strand of the cord connecting the sleeves of the plugs, a corresponding branch to ground from the other strand of the cord, including a corresponding self-induction coil, and a current indicating device at another board adapted to be connected to the test-ring of either of the switches of said line, whereby it may be determined whether either of said lines is in use.

9. The combination, with a metallic circuit $a$, extending from a subscriber's station to the central office and being there normally connected with several spring-jack switches $b'$ $b^2$ $b^3$ on different switch-boards, of a single telephone-line circuit $d$, extending from its subscriber's station to the central office and being there connected with several spring-jack switches $e'$ $e^2$ $e^3$ on different switch-boards, the test-circuit $g$, connected with the insulated frames or test-pieces of said switches $e'$ $e^2$ $e^3$, said test-circuit being connected through resistance $g'$ to ground, a pair of loop-plugs $s^2$ $s^3$ and their cords connecting said telephone lines together upon one of the switch-boards, a test-battery, and a self-induction coil branched to the strand of the cord connecting the sleeves of the plug, and a corresponding branch to ground from the other strand of the cord, including a corresponding self-induction coil, substantially as and for the purpose specified.

10. The combination, with two metallic telephone-line circuits looped together at one of several multiple switch-boards with which said lines are connected, of a branch circuit from the side of the united circuit, said lines connected with the test-pieces of the switches, said branch including a self-induction coil and battery, and a corresponding branch circuit to ground from the other side of said metallic circuit through a corresponding self-induction device, whereby the said circuit is balanced with respect to inductive effects, substantially as and for the purpose specified.

11. The combination, with an operator's telephone connected in circuit $o'$, and switching apparatus, of a bridge wire $q$ between the terminals of said telephone, said bridge-wire containing one coil of a converter and a ground circuit $q^3$, including the other coil of said converter, and provided with a movable terminal $q^2$, substantially as shown and described.

12. The combination, with the telephone connected with a strand of a flexible cord in the united circuit of two telephone-lines, of a converter with one of its coils bridging said telephone, a circuit provided with a movable terminal, including the other coil of said converter, and a test-terminal, of another telephone-line, to which said movable-terminal is applied, substantially as and for the purpose specified.

13. The combination, with a telephone-line connected with switches on different switch-boards, the switches of said line being provided with test-pieces permanently connected together, of a loop-plug inserted in one of the switches of said line, one point or terminal of said plug being connected with the spring or line terminal of the switch and the other point or contact of said plug connected with the test-piece of said switch, the strand of the cord connecting with the terminal of the plug which is closed to the test piece of the switch being branched through a self-induction coil and battery to ground, substantially as and for the purpose specified.

14. The combination, with several pairs of cords and their loop-plug terminals, of telephone-lines each connected with two or more spring-jack switches distributed on different switch-boards, the test-pieces of the switches of the different lines respectively being permanently connected together, the terminals of the different loop-plugs being adapted to close the one to the line terminal or spring of the switch in which it is inserted and the other terminal to the test-piece of the switch and a battery branched through different self-induction coils to the strand of each of the pairs of cords, which strand connects with the terminals of the plugs which close upon the test-pieces of the switches, whereby a common battery supplies current for many test connections.

In witness whereof I hereunto subscribe my name.

CHARLES E. SCRIBNER.

Witnesses:
ELLA EDLER,
GEORGE L. CRAGG.